Jan. 12, 1965 J. A. HARPER 3,165,001
ACTUATOR KNOB
Filed Aug. 22, 1962
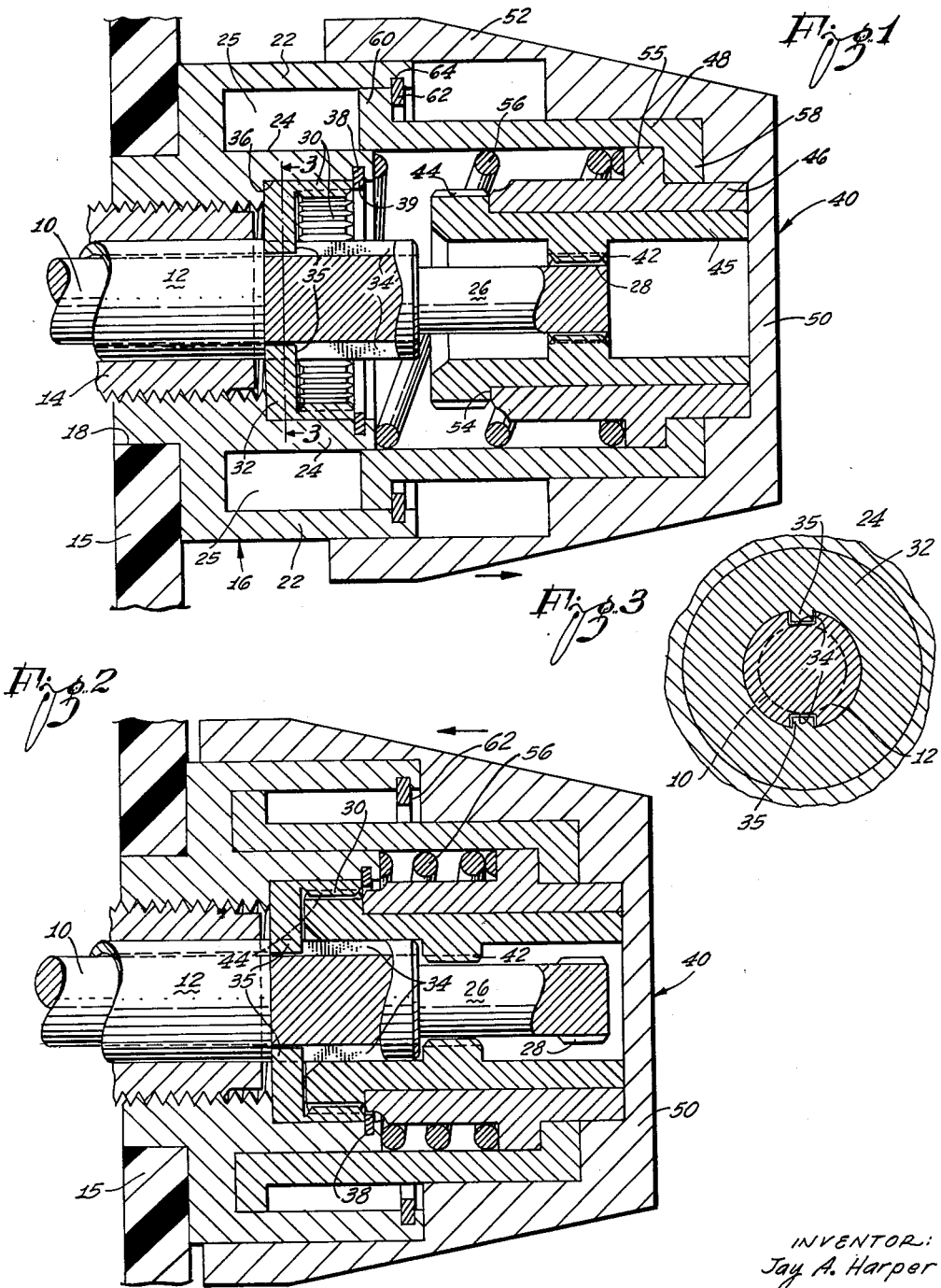
INVENTOR:
Jay A. Harper
Attorneys

United States Patent Office 3,165,001
Patented Jan. 12, 1965

3,165,001
ACTUATOR KNOB
Jay A. Harper, Gardena, Calif., assignor to Divac Electronics, a division of Acme Machine Works, Inc., Hawthorne, Calif., a corporation of California
Filed Aug. 22, 1962, Ser. No. 218,630
10 Claims. (Cl. 74—10.45)

This invention relates to means for selective manual actuation of two concentric shafts and, more particularly, is directed to the construction of a knob structure that is movable axially between a retracted position and an advanced position respectively for releasable engagement with the two shafts respectively. Such a dual manual control has utility, for example, for selectively controlling two electrical components such as two potentiometers.

One problem in the construction of such a dual control is to achieve the compactness that is commonly required for the control knob. Both the permissible overall axial dimension and the permissible overall diameter of the knob are limited.

A second problem is to provide such a control knob that moves freely between its two positions with no tendency to jam or bind when moved in either direction. In the usual arrangement, the knob is normally yieldingly maintained at its advanced position by a concealed spring and it should return freely to its advanced position whenever it is released at its retracted position. If it binds or hangs up at its retracted position it may be inadvertently manally rotated on the assumption that it is in its advanced position.

Binding action occurs when there is axial misalignment of the cooperating parts and two causes for such misalignment have been found. One cause is drooping or gravitational canting of the knob at its advanced position because of inadequate support. The second cause is that in the usual construction a gear is heat bonded to one of the two shafts by brazing or welding and is warped out of alignment by the applied heat.

Another problem is to provide a construction for such a dual control that is simple and inexpensive. The cost of the parts must be relatively low and the parts must lend themselves to assembly at minimum labor cost.

In general the invention achieves axial compactness by design and by minimizing the axial range of the movement of the knob structure and the invention achieves diametrical compactness by using telescoping annular elements of thin radial dimension. The problem of maintaining axial stability of the knob throughout its range of movement is met by supporting the knob at widely spaced points along its axis throughout its range of movement, this provision taking care of one of the two causes for misalignment. The other cause of misalignment which has been traced back to warpage involved in heat bonding a gear to one of the two shafts has been avoided by mechanically connecting the gear to the shaft in a floating manner, i.e., with freedom for slight angular movement of the gear relative to the shaft. This arrangement not only eliminates the application of heat but also makes the gear self-aligning in the sense that the gear on the shaft is free to accommodate itself automatically to the alignment of the corresponding cooperative gear on the knob.

Simplicity and ease of assembly are achieved by using a combination of multiple telescoping parts which may be readily assembled in sequence. The telescoping parts that are fixed relative to each other are simply adhesively bonded together in the course of the assembly procedure. Where there is relative movement between cooperating telescoping parts, simple snap rings are employed as required to limit the range of relative movement to keep the parts from becoming separated.

The features and advantages of the invention may be understood from the following detailed description together with the accompanying drawing.

In the drawing, which is to be regarded as merely illustrative:

FIG. 1 is an enlarged axial sectional view of the presently preferred embodiment of the invention with the manually operable knob at its normal spring-pressed advanced position;

FIG. 2 is a similar view showing the knob at its retracted position; and

FIG. 3 is a transverse section taken along the line 3—3 of FIG. 1 showing how a ring gear is floatingly keyed to the outer tubular shaft.

In the drawings illustrating the presently preferred embodiment of the invention, an inner shaft 10 is telescoped into and journaled by a second outer tubular shaft 12 which, in turn, is journaled in a bearing 14 carried by suitable fixed support structure. In the construction shown in the drawing, the fixed support includes a panel 15 and, in accord with the teachings of the invention, the fixed structure further includes a special guide member, generally designated 16, that is threaded onto the bearing 14 and is mounted in a circular aperture 18 in the panel 15. The guide member 16 which is suitably adapted for engagement by a wrench has an annular shoulder 20 which backs against the panel 15 and is further formed with an outer concentric wall 22 and an inner concentric wall 24 which together define a forwardly open annular guideway 25.

The inner shaft 10 extends beyond the outer tubular shaft 12, the exposed end portion 26 of the shaft being reduced in diameter and being provided with a first gear means comprising a pinion gear 28. With the end portion 26 reduced in diameter it is a simple matter to form the pinion gear 28 by machining the end of the shaft.

The tubular shaft 12 is provided with a second gear means in the form of a ring gear 30 and a feature of the invention is that this second gear means is mounted on the tubular shaft in a floating manner, i.e., with a certain freedom for angular movement relative to the tubular shaft. In the construction shown, the ring gear 30 is integral with a radial wall or collar 32 that is loosely slidingly keyed to the tubular shaft. For this purpose the end of the tubular shaft 12 has two diametrically opposite longitudinal slots 34 and, as indicated in FIG. 3, the collar 32 is formed with corresponding diametrically opposite inwardly directed tongues 35 that are slidable in the two slots. The ring gear 30 fits with a desirable degree of looseness in an annular seat 36 that is cut into the inner circumference of the inner concentric wall 24 of the fixed guide member 16, the ring gear being confined in the seat by a snap ring 38 which is mounted as shown in a corresponding groove 39 on the inner circumference of the concentric wall.

A knob structure, generally designated 40, slidingly engages the guide member 16 for axial movement between an extended position shown in FIG. 1 and a retracted position shown in FIG. 2. The knob structure 40 is provided with a third gear means 42 to engage the pinion gear 28 on the inner shaft 10 at the extended position of the knob structure and is provided with a fourth gear means 44 to engage the ring gear 30 at the retracted position of the knob structure.

A feature of the invention is the manner in which the knob structure 40 comprises a plurality of separate members for ease of fabrication and assembly, the several members being telescoped and fixedly bonded together. In the construction shown there are four telescoped members, namely, an inner gear sleeve 45, an annular spring seat 46, a guide sleeve 48 which forms what may be termed a concentric guide portion of the knob structure, and, finally, a knurled cap 50 having a cylinderical skirt 52 that slidingly embraces the outer concentric wall 22 of the fixed guide member 16. The inner gear sleeve 45 provides the third gear means 42 in the form of a ring gear to mesh with the pinion gear 28 and also forms the fourth gear means 44 in the form of a pinion gear to mesh with the ring gear 30.

The outer end of the gear sleeve 45 backs against the inner surface of the knurled cap 50 and the inner end is formed with a radial shoulder 54 for abutment with the annular spring seat 46. The annular spring seat 46 is confined between the radial shoulder 54 and the inner surface of the cap 50 and is formed with an outer radial flange 55. A suitable coil spring 56 that normally maintains the knob structure at its extended position is confined under compression between the radial flange 55 of the annular spring seat and the end of the inner concentric wall 24 of the fixed guide member 16.

The guide sleeve 48 is telescoped into the cap 50 and abuts against the inner surface of the cap. The outer end of the guide sleeve 48 has an inner radial flange 58 that hooks over the radial flange 55 of the annular spring seat and the inner end of the guide sleeve has an outward radial flange 60 which is dimensioned for snug, sliding fit in the previously mentioned annular guideway 25 of the fixed guide member 16. A snap ring 62 mounted in a corresponding inner circumferential groove 64 in the outer concentric wall 22 of the fixed guide member 16 serves as a stop for abutment by the radial flange 60 of the guide sleeve 48 at the extended position of the knob structure.

The first step in assembling the device is to insert the ring gear 30 into the annular seat 36 of the guide member 16 and to install the snap ring 38 to confine the ring gear. The second step is to bond the gear sleeve 45 in its telescoped position in the annular spring seat 46 by suitable adhesive or cement and in the same manner to bond the annular spring seat 46 in the guide sleeve 48 against the inner flange 58 of the guide sleeve. The third step is to insert the spring 56 into the guide sleeve 48 against the radial flange 55 of the annular spring seat 46 and then to install the bonded subassembly comprising the gear sleeve 45, the annular spring seat 46 and the guide sleeve 48. The subassembly is installed by inserting the guide sleeve 48 into the annular guideway 25 and then seating the snap ring 62 in the inner circumferential groove 64. The last step consists in telescoping the cap 50 over the three-member assembly and securing the cap in place by suitable adhesive or cement.

The manner in which the invention serves its purpose may be readily appreciated from the foregoing description. Normally the knob assembly is held in its advanced or extended position by means of the concealed coil spring 56. It may be said that the pinion gear 28 is at an advanced position on the inner shaft 10 and the ring gear 42 is at an advanced position on the knob structure 40 since these two gears mesh at the advanced position of the knob structure shown in FIG. 1. For like reason it may be said that the ring gear 30 is mounted at a retracted position on the outer tubular shaft 12 and the pinion gear 44 is mounted at a retracted position on the knob structure 40 since these two gears mesh when the knob structure is at its retracted position shown in FIG. 2.

With reference to stability of the knob structure 40 in its range of axial movement, it is to be noted that in FIG. 1 the knob structure is supported at widely spaced points. Thus the guide sleeve 48 is confined by the annular guideway 25 at one point and the pinion gear 28 of the inner shaft supports the knob structure at a second point that is spaced a substantial distance from the first point. When the knob structure 40 is depressed towards its retracted position, the guide sleeve 48 progressively enters the annular guideway 25 and by the time the ring gear 42 of the knob structure is free from the pinion gear 28 of the inner shaft 10 the guide sleeve in cooperation with the guideway is capable of maintaining the desired axial alignment of the knob structure with the two shafts.

The floating manner in which the ring gear 30 is mounted on the outer tubular shaft 12 is an important feature of the invention since this construction eliminates any warpage that could be caused by welding or brazing. The floating manner in which the ring gear 30 is retained permits the ring gear to adjust itself freely to axial alignment with the pinion gear 44 of the knob structure. It is apparent that the described construction eliminates the usual causes for binding in the movement of the knob structure between its two alternate positions. As a consequence the knob structure is freely returned by the spring 56 to its advanced position whenever it is manually pressed and the knob structure may be depended upon to be at its advanced position at all times when it is free from manual restraint.

My description in specific detail of the selected embodiment of the invention will suggest various changes, substitutions and other departures from my disclosure within the spirit and scope of the appended claims.

I claim:

1. A manual control for selective actuation of an outer tubular shaft journaled in fixed support structure and an inner shaft mounted in the outer shaft, comprising: a first gear mounted on an end portion of the inner shaft; a second gear mounted on the corresponding end portion of the outer shaft; a knob structure enclosing said end portions of the two shafts and movable axially of the two shafts between an extended position and a retracted position; a third gear fixedly carried by said knob structure to engage said first gear at one of the two positions of the knob structure; and a fourth gear fixedly carried by said knob structure to engage said second gear at the other of the two positions of the knob structure, said second gear being mounted on said outer shaft with freedom for angular movement for self-adjustment of the second gear in its engagement with the fourth gear.

2. A manual control for selective actuation of an outer tubular shaft journaled in fixed support structure and an inner shaft mounted in the outer shaft, comprising: a first pinion gear on said inner shaft; a second ring gear floatingly keyed to said outer shaft; a knob structure enclosing both of said gears and slidingly mounted on said fixed structure for movement in one axial direction from an advanced position to a retracted position and vice versa, said second gear being spaced from the first gear in said axial direction; a third ring gear mounted at an advanced position on the knob structure to engage said first gear at the advanced position of the knob structure; and a fourth pinion gear mounted at a retracted position on the knob structure to engage said second gear at the retracted position of the knob structure.

3. A combination as set forth in claim 2 in which said outer shaft is slotted to slidingly engage said second ring gear; and which includes a snap ring to confine the second ring gear axially.

4. A combination as set forth in claim 2 in which said fixed structure encloses said second ring gear and said snap ring is mounted on the fixed structure.

5. The combination of: an outer tubular shaft; an inner shaft journaled in said outer shaft with the end of the inner shaft extending beyond the end of the outer shaft; a support structure journaling the outer shaft near the end thereof, said support structure having a forwardly extending inner concentric wall and a forwardly extending outer concentric wall forming therewith a forwardly open concentric annular guideway; a first gear on the end of said inner shaft; a second gear on the end of said outer shaft; a knob structure having a concentric guide portion slidingly fitted into said annular guideway and reciprocative therein for axial movement of the knob structure between an advanced position and a retracted position; a third gear inside said knob structure to mesh with said first gear at the advanced position of the knob structure and thus cooperate with said annular guideway to maintain axial alignment of the knob structure at its advanced position; and a fourth gear inside said knob structure to engage said second gear at the retracted position of the knob structure.

6. A combination as set forth in claim 5 in which said second gear is a ring gear journaled in said inner concentric wall of the support structure.

7. The combination of: an outer tubular shaft; an inner shaft journaled in said outer shaft with the end of the inner shaft extending beyond the end of the outer shaft; a support structure journaling the outer shaft near the end thereof, said support structure having a forwardly extending inner concentric wall and a forwardly extending outer concentric wall forming therewith a forwardly open concentric annular guideway; a first pinion gear on the end of said inner shaft; a second ring gear floating keyed on the end of said tubular shaft inside said inner concentric wall; a knob structure having an outer cylindrical skirt slidingly telescoped over said outer concentric wall and having a concentric guide portion slidingly fitted into said annular guideway and reciprocative therein for axial movement of the knob structure between an advanced position and a retracted position; a third ring gear inside said knob structure to mesh with said first gear at the advanced position of the knob structure and thus cooperate with said annular guideway to maintain axial alignment of the knob structure at its advanced position; and a fourth pinion gear mounted inside said knob structure to engage said second ring gear at the retracted position of the knob structure.

8. A combination as set forth in claim 7 which includes a snap ring mounted inside said outer concentric wall to engage and retain said concentric guide portion of the knob structure at the advanced position of the guide structure; and in which said cylindrical skirt is a separate member whereby the skirt may be installed on the knob structure after said snap ring is installed.

9. A manual control for selective actuation of an outer tubular shaft journaled in fixed support structure and an inner shaft mounted in the outer shaft, comprising: an outer concentric wall and an inner concentric wall extending forward from said fixed support structure and forming a forwardly open annular guideway; a knob structure having a concentric guide portion slidingly telescoped in said glideway for axial movement of the knob structure between an advanced position and a retracted position; cooperating gear means on the knob structure and one of said shafts engageable at the advanced position of the knob structure; cooperating gear means on the knob structure and the other of said shafts engageable at the retracted position of the knob structure; and a coil spring concealed inside the knob structure in compression between the knob structure and the fixed support structure to normally maintain the knob structure at its advanced position.

10. A combination as set forth in claim 9 in which said knob structure has an outer wall slidingly telescoped over said outer concentric wall of the fixed support structure; and in which the knob structure has a concentric portion radially inward from said concentric guide portion and forming therewith an annular space confining said spring.

References Cited in the file of this patent
UNITED STATES PATENTS

| | | |
|---|---|---|
| 2,382,110 | Sheldrick et al. | Aug. 14, 1945 |
| 2,454,122 | Barger | Nov. 16, 1948 |
| 2,550,314 | Winckler | Apr. 24, 1951 |